Sept. 9, 1952     P. V. OSBORN     2,609,710
PIN DOWELED BEARING CAP
Filed June 11, 1948     2 SHEETS—SHEET 2
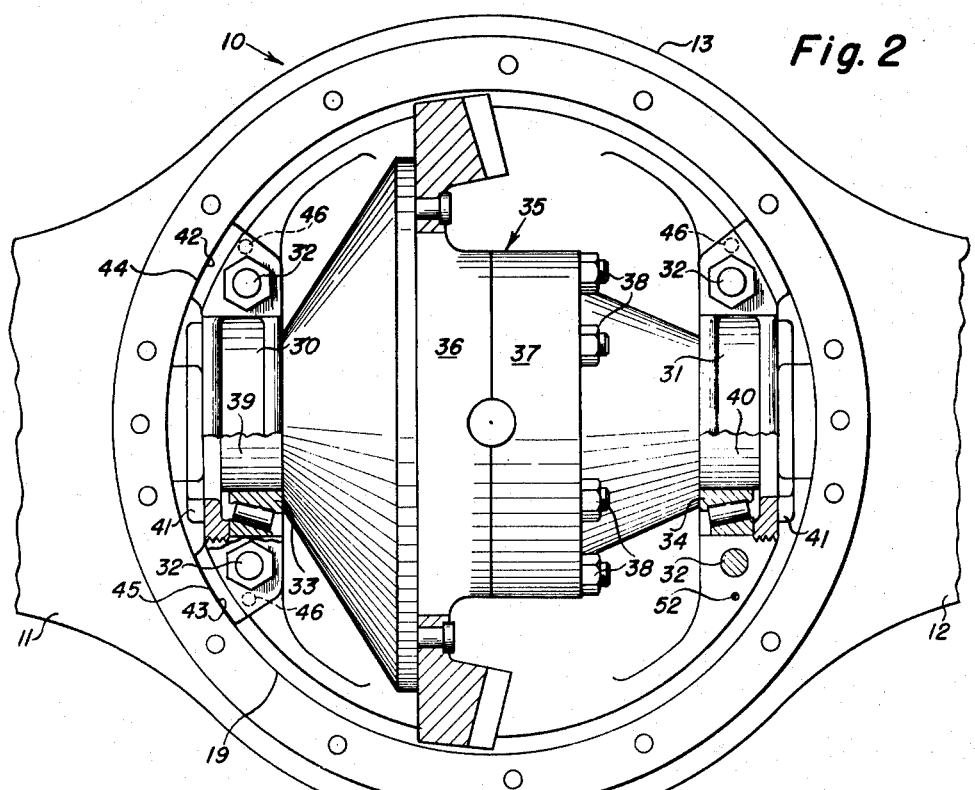
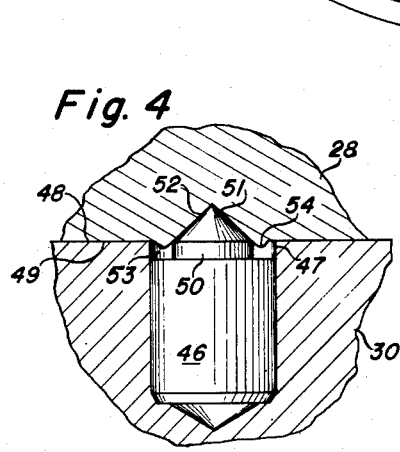
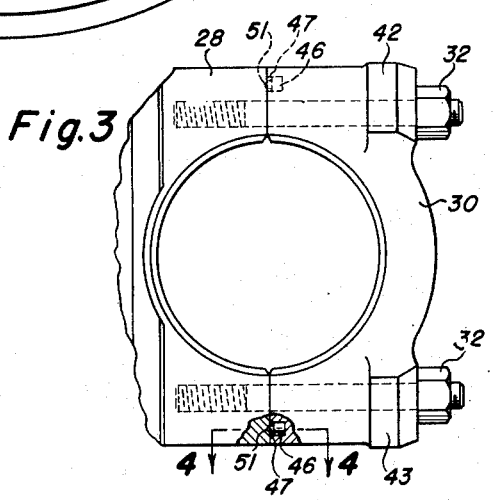
INVENTOR
Paul V. Osborn
By Strauch + Hoffman
Attorneys Patented Sept. 9, 1952

2,609,710

UNITED STATES PATENT OFFICE 2,609,710

PIN DOWELED BEARING CAP

Paul V. Osborn, Detroit, Mich., assignor to The Timken-Detroit Axle Company, Detroit, Mich., a corporation of Ohio Application June 11, 1948, Serial No. 32,509

9 Claims. (Cl. 74—713)

This invention relates to bearing carriers or supports and more particularly to a bearing carrier for vehicle drive mechanism, such as that shown in the United States patent to Alden, No. 2,120,594, issued December 14, 1938.

In this patent a differential carrier is mounted on the front wall of an axle housing and is provided with spaced legs extending into the housing and having semi-circular bearing supporting seats. A complementary semi-circular bearing cap is securely bolted to each carrier leg and together therewith provides a cylindrical bearing receiving bore. The carrier leg and cap member are threaded at the outer end of said bore to receive a bearing adjusting nut. In the manufacture of bearing carriers of this type it has heretofore been the practice to first machine the carrier casting except for the bearing supporting legs, and then drill and tap the legs to receive securing studs for the bearing caps, after which the coacting locating faces of the legs and caps are machined. The cap members are next applied to the carrier legs and the nuts drawn up on the studs with a predetermined torque and the cylindrical bores then reamed and threaded to receive the outer race rings of the bearings and the adjusting nuts.

The bearing caps are then removed and the differential unit with its bearings placed in position between the carrier legs, after which the caps are replaced and the stud nuts securely tightened. The adjusting nuts are then applied and the bearings preloaded. It has been found that owing to mismating or misalignment of the threads on the carrier legs and bearing caps, in making these adjustments, reactionary forces tend to spread or angularly deflect the carrier legs and reposition the bearing caps, resulting in misalignment of the two bearings. This often caused premature bearing failures and rendered it difficult if not impossible to make the extremely accurate and sensitive bearing adjustments which are frequently required in order to establish a proper coacting relationship between the teeth on the ring gear of the differential and the teeth of the pinion of drive shaft 20. It has heretofore been the practice, wherein friction alone is relied upon to prevent slippage of the bearing caps relative to the carrier legs, to realign the threaded sections of said legs and bearing caps and their bearing supporting surfaces by tapping the cap members into position with a mallet. This, however, frequently resulted in an axial misalignment of the bearings.

Accordingly, it is the general object and purpose of the present invention to provide certain improvements in the construction and method of manufacture and assembly of such bearing carriers whereby, when the bearings are preloaded, relative displacement thereof from an accurately coaxial relationship is precluded.

More specifically the invention resides in the provision of means on one of the bearing support members, which, in the initial assembly, forms an interlock with the opposed locating face of the other member, so that in the final assembly, said interlocking means insures accurate mating of the threads on said members to receive the bearing adjusting nut.

A further object is to provide a novel method whereby the final machining operations on the parts of the bearing carrier and thereafter assembly with the bearings for the preloading adjustment of the bearings will be materially expedited.

An additional object of the invention resides in the provision of a differential carrier having spaced bearing supporting legs for the differential unit insertable therewith through one side wall of an axle housing, each of said legs carrying spaced parts having piloting contact with the circumferential face of an opening in the opposite housing wall to prevent displacement of said legs relative to the housing walls by driving torque stresses and support the differential unit for rotation about a definitely fixed axis.

With the above and other subordinate objects in view, the invention comprises the improved bearing carrier and method of manufacture and assembly thereof, as will be hereinafter more fully described, illustrated in the accompanying drawings, and subsequently defined in the subjoined claims.

In the drawings wherein I have disclosed several desirable and practical embodiments of the invention and in which similar reference characters designate corresponding parts throughout the several views:

Figure 2 is a rear elevation of the differential driving assembly mounted within the axle housing, the carrier bearing supports being shown partly in section and the rear housing cover removed;

Figure 3 is a side elevation showing one of the bearing supporting legs on the differential carrier and the associated bearing cap connected in assembled relation therewith; and Figure 4 is a detail horizontal section on an enlarged scale taken substantially on the line 4—4 of Figure 3.

Figure 1:
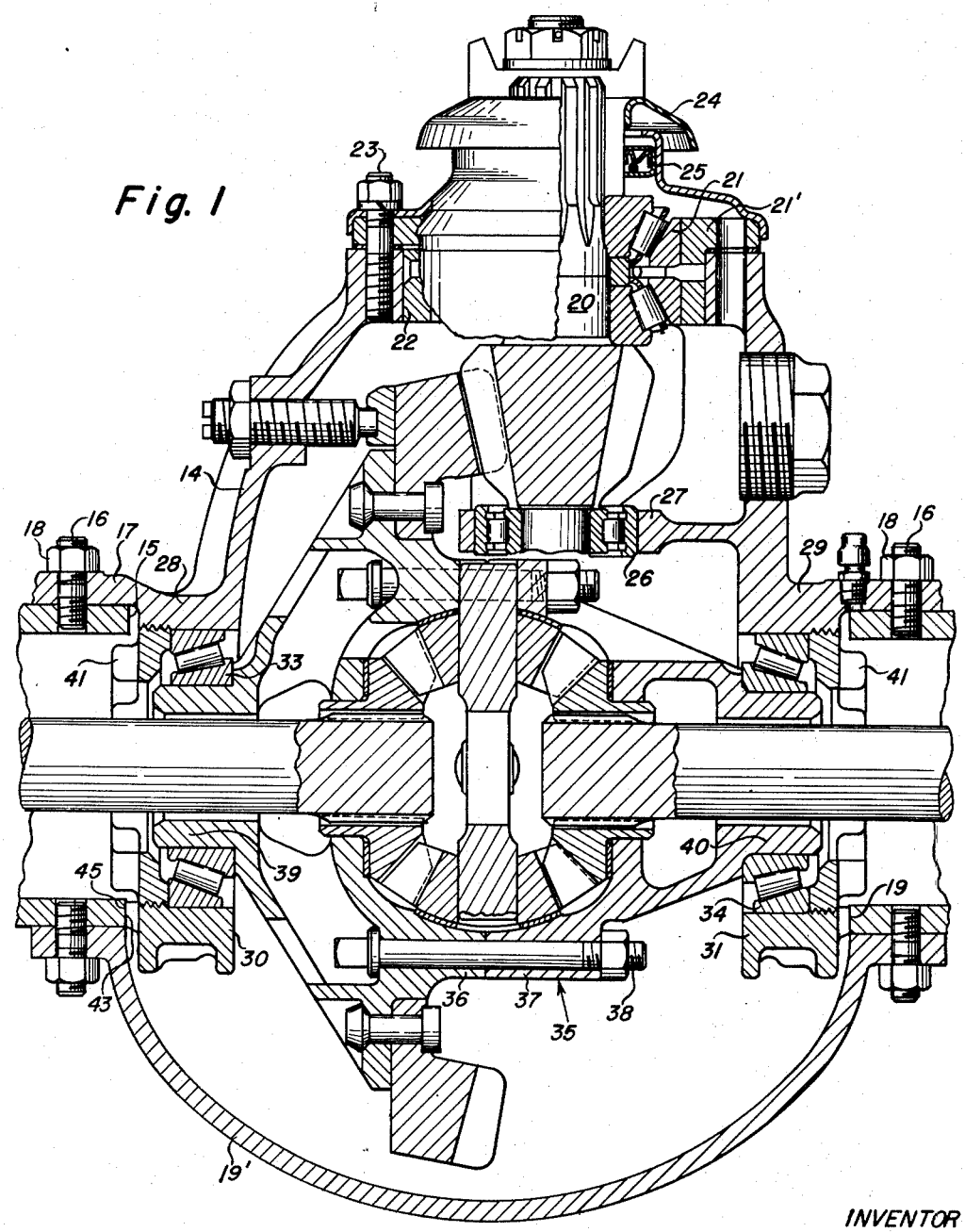
Figure 1 is a horizontal sectional view illustrating an embodiment of the invention as applied to the differential carrier of a vehicle drive mechanism.

For the purpose of illustrating one desirable application of my present improvements, in the drawings I have shown a well known type of differential unit and housing structure for a vehicle drive axle, though it will be understood, as this description proceeds, that certain features of the present disclosure may also be advantageously utilized in connection with various other mechanisms or apparatus. As herein shown, the axle housing includes axle shaft housing arms 11 and 12 extending in opposite directions from and integrally joining a central enlarged differential housing section 10 to provide a basic housing member of the conventional banjo type. The front and rear side walls of the central housing section 13 are provided with large diameter openings 15 and 19 respectively. A differential carrier 14 is adapted to be secured to the front wall or flange of housing section 10 over the opening 15 therein by means of studs 16 fixed in the housing wall extending through openings in a flange 17 on the carrier which is tightly clamped to the housing wall by nuts 18 threaded on said studs.

The rear opening 19 of the axle housing is adapted to be closed by a bowl or cover member 19' secured to the rear housing wall in a similar manner.

The usual drive pinion shaft 20 is journalled at one end by a suitable bearing 21 in a bearing cage 21' which is mounted in an opening 22 in the front end of the carrier 14 and secured thereto in conventional manner, as by means of studs and nuts 23 which also secure to the carrier a cover member 24 containing a sealing unit 25. At its rear end the pinion shaft is journalled in a bearing 26 supported in a boss 27 integrally joined with one side wall of the carrier. The motor driven propeller shaft (not shown) is adapted to be connected in conventional manner with the forward end of the pinion shaft 20.

The carrier 14 at opposite sides thereof is formed with the aligned legs 28 and 29 respectively which extend into the axle housing, and with each of these carrier legs a bearing cap member is associated. These cap members 30 and 31 and the respective carrier legs 28 and 29 have opposed semi-cylindrical concave seating surfaces and are connected in assembled relation by means of studs 32 and nuts 32' to receive and support the differential bearings 33 and 34 respectively.

The differential unit generally indicated at 35, includes a spider, pinions and side gears together with a case therefor comprising two sections 36 and 37 rigidly connected by suitable bolts 38 to retain the differential elements in proper assembled relation. The case section 36 has a hub 39 journalled in the tapered roller bearing 33 mounted in the carrier leg 28 and cap member 30, and case section 37 has a hub 40 which is similarly journalled in the tapered roller bearing 34 mounted in carrier leg 29 and cap member 31. The bearings 33 and 34 are held against axial movement by annular retaining and adjusting nuts 41 threaded into the outer ends of the bores of the associated carrier legs and cap members.

Preferably, in this embodiment of the invention, the cap members 30 and 31 are provided at the threaded ends thereof with vertically spaced arcuate piloting surfaces 42 and 43 respectively which, in the assembly of the differential unit and its carrier in the housing, coact with similar piloting surfaces 44 and 45 provided on the circumferential face of the opening 19 in the rear wall of the housing.

Referring now to Figures 3 and 4 of the drawings, each bearing cap is provided with cylindrical bores 47 spaced radially outward from the respective stud receiving bores in the upper and lower ends of the bearing caps and in accurate parallelism therewith. Into each bore 47, a dowel pin 46 is inserted with a press fit. The opposing faces 48 and 49 respectively of the carrier leg and the bearing cap, above and below the bearing receiving seats, are accurately machined so that when assembled, the contacting plane of these abutting surfaces of the bearing cap and carrier leg will accurately intersect the common axis of said bearing seats.

At the open end of the bore 47, the dowel pin 46 is provided with an axially projecting part 50 of reduced diameter, terminating in a sharply pointed cone which projects beyond the face 49 of the bearing cap for approximately $\frac{1}{16}''$ to $\frac{3}{32}''$.

The dowel pins 46 are heat treated and hardened so that, when the bearing cap is forced under pressure to assembled position with the faces 49 thereof substantially contacting the faces 48 of the carrier legs, the sharp cone points 51 of the dowel pins will pierce the faces 48 of the carrier leg and form the conical depressions or recesses 52 therein, thus securely locking the bearing cap to the carrier leg and effectively preventing relative displacement thereof in the plane of the contacting faces 48 and 49.

The space between the small diameter portion 50 of the dowel pin and the wall of the bore 47 provides a groove 53 for the reception of the burr, indicated at 54, which forms on the face 48 of the carrier leg as the latter is pierced by the conical end 51 of the dowel pin.

*Method of manufacture and assembly*

The carrier casting 14 is first machined with the exception of the bearing seats and provided with threaded bores for the reception of stud bolts 32. Similarly the bearing cap members are machined and provided with registering stud receiving bores and the dowel pins 46. After inserting the studs in the carrier legs, the bearing caps are then assembled thereon and the nuts 32' tightened on stud bolts 32 with the required torque to bring the faces 49 of the cap members into close abutting contact with the opposed faces 48 on the carrier legs. In this operation, the conical ends of the dowel pins 46 pierce the faces 48 of the carrier legs and form the interlocking depressions or recesses 52 therein. This adjustment is carefully controlled so that as the dowel pins pierce the carrier legs, the ends of the semi-circular bearing seats in said legs and the bearing caps are caused to accurately register with each other.

The bearing seats of these spaced carrier legs and cap members are now machined and reamed to form cylindrical bores or bearing supporting surfaces which are in accurate axial alignment. The outer end portions of these bores are then tapped or threaded to receive the adjusting nuts 41.

The bearing caps are now removed and the differential unit assembly mounted upon the carrier with its bearings 33 and 34 in contact with the machined seating surfaces of the carrier legs. Cap members 30 and 31 are then reassembled on stud bolts 32 and the bolt nuts tightened with the required torque to contact abutment faces 49 with the faces 48 on the carrier legs and bring the conical ends of the dowel pins 46 into tight contact upon the walls of the depressions or recesses 52, and thus reestablish the initial accurately registered relationship of the seat surfaces and threads on the carrier legs and cap members. The nuts 41 may now be easily and quickly adjusted to preload the bearings 33 and 34 to the required extent, without shifting the bearing caps out of alignment with the carrier legs and hence without causing reactionary pressure forces against the carrier legs tending to angularly displace the bearings 33 and 34 out of accurately aligned relation with each other.

After the differential unit has been assembled upon the carrier legs in the manner above explained, said unit and the carrier legs are then inserted through the opening in the front wall of differential housing 10. As the bolting flange 17 on the carrier is moved into contact with the housing wall and upon the studs 16, the piloting faces 43 and 44 on bearing caps 30 and 31 move into close contacting relation upon the opposed finished piloting surfaces 44 and 45 of the circumferential surface of opening 19 in the rear housing wall. Thus the carrier legs and the bearing supports will be rigidly sustained between the front and rear walls of the housing and restrained against angular displacement relative thereto by the distorting effect of heavy torque forces in the operation of the differential. This feature further insures a constant co-axial relation of the spaced differential bearings with the axle housing and prolonged useful service thereof with maximum operating efficiency.

From the above, it will be evident that by the provision of the means for positively interlocking the bearing caps with the carrier legs and the novel method of manufacture and assembly heretofore described, the present invention provides means for quickly and accurately preloading the bearings of a differential drive unit or other mechanism with the assurance that the initial co-axial relation of said bearings will not be altered or disturbed while the carrier can also be easily and accurately located within the axle housing and positioned relative thereto to maintain such co-axial relationship of the bearings in the operation of the mechanism.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. Means for accurately relocating two cooperating members which are separated after initial assembly and then reassembled comprising opposed locating faces on said members, a projection on one of said faces adapted to form and enter a permanent depression in the other of said faces during initial assembly of said members while permitting full contact of said locating faces in the assembly, and means releasably securing said members together in assembly, said projection and depression cooperatively providing accurate relocation of said members during subsequent reassembly.

2. The means defined in claim 1 wherein a recess is provided about the projection in said first face to receive displaced metal from said depression.

3. Means for accurately relocating two bearing support members that are separated after initial assembly and then reassembled comprising opposed coextensive surfaces on the respective members adapted to be pressed together in the assembly, a sharp projection on one of said surfaces adapted to form and enter a permanent depression in the opposed surface during said initial assembly while permitting full contact of said co-extensive surfaces in said assembly, and means releasably securing said members together, said projection and depression cooperatively serving to relocate said members during any subsequent reassembly.

4. Locating means as defined in claim 3 comprising at least two sharp pointed projections and coacting depressions formed and entered thereby at said surfaces.

5. In a carrier for an axle drive unit having spaced bearing supporting legs, a cap member for each leg, means for mounting said cap members on said legs with co-extensive surfaces of said members and legs in contact, each carrier leg and cap member having concave seating surfaces for clamping a bearing therebetween, and means at said co-extensive surfaces automatically coacting during assembly of said cap members with said legs to accurately relatively locate said members on said legs comprising a hard projection upstanding rigidly from one of said surfaces adapted to penetrate and form a depression in the associated opposed surface during initial assembly of each cap member on its carrier leg but permitting said co-extensive surfaces to be drawn into full contact in the assembly, said projections and said depression serving to accurately relocate said caps on said legs during subsequent reassembly.

6. A carrier for an axle drive unit, as defined in claim 5, in which said projecting part is surrounded by a groove to receive displaced metal resulting from the formation of said depression.

7. A carrier for an axle drive unit as defined in claim 5, wherein each said projection comprises a body fitted in a bore in one of said surfaces and a relatively pointed end formed upon a reduced axial extension of said body to provide an annular burr receiving recess between said extension and the wall of said bore to permit said cap to seat on its associated leg with said co-extensive surfaces in full surface contact.

8. Means for accurately relocating two cooperating metal members which are separated after initial assembly and then reassembled, comprising opposed locating faces on said members, a hard metal projection on one of said faces adapted to form and enter a permanent depression in the other of said faces during initial assembly of said members but permitting contact of said faces in the assembly, means providing a recess about the projection in said one of said faces to receive displaced metal from said depression, and means releasably securing said members together in assembly, said projection and depression cooperatively providing accurate relocation of said members during subsequent reassembly.

9. The method of assembling a two-part bearing support which comprises providing the separate parts having semi-circular cavities therein and adjacent abutment faces with at least one abutment face having a sharp projection protruding therefrom, then assembling said parts with said cavities opposed so that said projection forms and enters a depression in the opposite abutment face, then machining said cavities to form bearing seats, then disassembling said parts and mounting a bearing in the seats and reassembling the parts, said projection and depression accurately relocating said parts in the assembly.

PAUL V. OSBORN.

REFERENCES CITED

The following references are of record in the file of this patent:

UNITED STATES PATENTS

| Number | Name | Date |
|---|---|---|
| 1,157,666 | Bennett | Oct. 26, 1915 |
| 1,410,058 | Gentzel | Mar. 21, 1922 |
| 1,828,025 | Church | Oct. 20, 1931 |
| 1,880,655 | Baits | Oct. 4, 1932 |
| 1,999,077 | Benedetto | Apr. 23, 1935 |
| 2,016,343 | Oberem | Oct. 8, 1935 |
| 2,133,112 | Ormsby | Oct. 11, 1938 |
| 2,147,343 | Hokanson | Feb. 14, 1939 |
| 2,219,025 | Vanderberg | Oct. 22, 1940 |
| 2,306,233 | Smith | Dec. 22, 1942 |
| 2,311,434 | Dusevoir | Feb. 16, 1943 |
| 2,315,006 | Misch | Mar. 30, 1943 |
| 2,371,399 | Mantle | Mar. 13, 1945 |
| 2,404,456 | Pierce | July 23, 1946 |

FOREIGN PATENTS

| Number | Country | Date |
|---|---|---|
| 545,011 | Great Britain | May 7, 1942 |
| 330,504 | France | Aug. 19, 1903 |
| 505,819 | France | Aug. 7, 1920 |
| 290,651 | Italy | Nov. 25, 1931 |